US012580431B2

(12) United States Patent
Dotz

(10) Patent No.: US 12,580,431 B2
(45) Date of Patent: Mar. 17, 2026

(54) STATOR FOR AN ELECTRIC MACHINE AND ELECTRIC MACHINE FOR DRIVING A VEHICLE

(71) Applicant: Valeo eAutomotive Germany GmbH, Erlangen (DE)

(72) Inventor: Boris Dotz, Bad Neustadt a.d.Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 224 days.

(21) Appl. No.: 18/257,446

(22) PCT Filed: Dec. 8, 2021

(86) PCT No.: PCT/EP2021/084852
§ 371 (c)(1),
(2) Date: Jun. 14, 2023

(87) PCT Pub. No.: WO2022/128695
PCT Pub. Date: Jun. 23, 2022

(65) Prior Publication Data
US 2024/0030759 A1 Jan. 25, 2024

(30) Foreign Application Priority Data
Dec. 16, 2020 (DE) ..................... 10 2020 216 005.8

(51) Int. Cl.
*H02K 1/16* (2006.01)
*H02K 3/12* (2006.01)
(Continued)

(52) U.S. Cl.
CPC .............. *H02K 1/165* (2013.01); *H02K 3/12* (2013.01); *H02K 3/28* (2013.01); *H02K 29/03* (2013.01); *H02K 2205/12* (2013.01)

(58) Field of Classification Search
CPC .......... H02K 1/16; H02K 1/165; H02K 29/03; H02K 2213/03; H02K 2213/09
(Continued)

(56) References Cited

U.S. PATENT DOCUMENTS 6,288,471 B1 9/2001 Kometani et al.
9,590,458 B2 3/2017 Chin et al.
(Continued)

FOREIGN PATENT DOCUMENTS

JP 3590623 B2 11/2004

OTHER PUBLICATIONS

International Search Report issued Apr. 4, 2022 in PCT/EP2021/084852 filed on Dec. 8, 2021, 2 pages.

*Primary Examiner* — Oluseye Iwarere
*Assistant Examiner* — Minki Chang
(74) *Attorney, Agent, or Firm* — Oblon, McClelland, Maier & Neustadt, L.L.P.

(57) ABSTRACT

A stator for an electric machine includes a distributed stator winding with N phase windings, P pole pairs, and a stator core having slots in which the stator winding is arranged. The stator core is subdivided into 2·P·N winding zones following each other in the circumferential direction and including axial recesses which form at least one set of recesses following each other. At least two recesses are part of one of the winding zones. Each pair of recesses that adjoin each other in the circumferential direction and are part of the same winding zone has a first angular distance from each other in the circumferential direction. Each pair of recesses which adjoin each other and are part of different winding zones has a second angular distance. In at least one set, the first and angular distance differ such that the set is an irregular set.

20 Claims, 10 Drawing Sheets

(51) Int. Cl.
     *H02K 3/28*           (2006.01)
     *H02K 29/03*         (2006.01)

(58) Field of Classification Search
     USPC ................................... 310/216.069, 216.071
     See application file for complete search history.

(56)                References Cited

U.S. PATENT DOCUMENTS

| | | |
|---|---|---|
| 2004/0012292 A1 | 1/2004 | Kometani et al. |
| 2010/0176675 A1* | 7/2010 | Labbe ...................... H02K 1/17 |
| | | 310/195 |
| 2013/0088116 A1 | 4/2013 | Chin et al. |
| 2018/0102678 A1* | 4/2018 | Kusase ................... H02K 1/14 |

\* cited by examiner

STATOR FOR AN ELECTRIC MACHINE AND ELECTRIC MACHINE FOR DRIVING A VEHICLE

The present invention relates to a stator for an electric machine, wherein the stator has a distributed stator winding having a number N of phase windings, a number P of pole pairs and a stator core, in which slots are formed, wherein the stator winding is arranged in the slots; wherein the stator core is divided into 2×P×N winding zones which follow each other uniformly in a circumferential direction; wherein the stator core has a large number of recesses which extend in an axial direction from a first end face of the stator core to a second end face, which is opposite the first end face, of the stator core; wherein the recesses form at least one arrangement of recesses which follow each other in a circumferential direction and at least two recesses of the arrangement belong to one of the winding zones; wherein each pair of recesses which are adjacent in a circumferential direction and which belong to the same winding zone has a first angular spacing in a circumferential direction relative to each other; wherein each pair of recesses which are adjacent in a circumferential direction and which belong to different winding zones has a second angular spacing in a circumferential direction relative to each other.

In addition, the invention relates to an electric machine for driving a vehicle.

The document US 2015/0381000 A1 discloses a stator for a rotating electric machine comprising an annular stator core having a large number of pairs of slots for a first phase, a large number of pairs of slots for a second phase and a large number of pairs of slots for a third phase which are provided so as to follow each other and to repeat in a circumferential direction; and a stator winding comprising a winding for a first phase, a winding for a second phase and a winding for a third phase which are arranged on the stator core in order to be received in the corresponding slots. Portions of the stator winding which are received in the slots are stacked radially in four layers.

The articles by I. Petrov, P. Ponomarev and J. Pyrhonen: "Torque ripple reduction in 12-slot 10-pole fractional slot permanent magnet synchronous motors with non-overlapping windings by implementation of unequal stator teeth widths," International Conference on Electrical Machines (ICEM), pp. 1455-1460, 2014; by I. Petroy, P. Ponomarev, Y. Alexandrova and J. Pyrhonen: "Unequal Teeth Widths for Torque Ripple Reduction in Permanent Magnet Synchronous Machines With Fractional-Slot Non-Overlapping Windings," IEEE Trans. Magn, vol. 51, no. 2, pp. 1-9, 2015; and by P. Ponomarev, I. Petrov and J. Pyrhonen: "Torque ripple reduction in double-layer 18/16 TC-PMSMs by adjusting teeth widths to minimize local saturation," International Conference on Electrical Machines (ICEM), pp. 1461-1467, 2014 each disclose a stator having concentrated toothed coil windings and unequal stator tooth widths.

In stators having distributed stator windings, which are received in slots, which are arranged uniformly in a circumferential direction, parasitic forces occur during operation of an electric machine which has the stator. A great torque ripple, which causes undesirable vibrations and operating noise, can thereby occur.

An object of the invention is to provide a method for operating an electric machine with a stator having a distributed stator winding more quietly.

This object is achieved according to the invention with a stator of the type mentioned in the introduction in that in at least one arrangement the first angular spacing and the second angular spacing are different so that the arrangement is in the form of a non-uniform arrangement.

The stator for an electric machine has a distributed stator winding. The stator winding has a number N of phase windings. The stator has a number P of pole pairs. The stator has a stator core. slots are formed in the stator core. The stator winding is arranged in the slots. The stator core is divided into 2×P×N winding zones. The winding zones follow each other uniformly in a circumferential direction. The stator core has a large number of recesses. The recesses extend in an axial direction from a first end face of the stator core to a second end face of the stator core. The second end face is opposite the first end face. The recesses form at least one arrangement of recesses which follow each other in a circumferential direction. At least two recesses of the arrangement belong to one of the winding zones. Each pair of recesses which are adjacent in a circumferential direction and which belong to the same winding zone have a first winding spacing relative to each other in a circumferential direction. Each pair of recesses which are adjacent in a circumferential direction and which belong to different winding zones have a second winding spacing relative to each other in a circumferential direction. In at least one arrangement, the first winding spacing and the second winding spacing are different so that the arrangement is in the form of a non-uniform arrangement.

The stator according to the invention is particularly characterized in that the recesses which extend in an axial direction are not arranged in at least one arrangement in a uniform manner in a circumferential direction but instead are displaced with respect to a respective winding zone so that the second winding spacing of the pair of recesses which are adjacent in a circumferential direction and which belong to different winding zones is different. The occurrence of parasitic forces during operation of the electric machine can thereby be substantially reduced because cogging torques which trigger an increased torque ripple are reduced. This advantageously allows the electric machine to be operated more quietly, particularly with reduced vibrations and noise, without any substantial disadvantages in terms of the performance thereof.

The stator core is preferably in the form of a sheet assembly. The recesses typically extend parallel with a longitudinal axis of the stator core in an axial direction. It is preferable for N=3 or N to be an integral multiple of 3. It is further preferable for P to be equal to 2, 4, 6 or 8. In the at least one arrangement, each m≥2, in particular m=2, 3 or 4, recesses preferably belong to one of the winding zones. Preferably, the recesses of a respective arrangement have the same shape when viewed from the first end face.

The first angular spacing is preferably defined as the difference between the angular positions of the recesses of the pair of adjacent recesses, which belong to the same winding zones. The second angular spacing is preferably defined as the difference between the angular positions of the recesses of the pair of adjacent recesses, which belong to different winding zones. The angular position of a respective recess can be defined as the angular position of a radial tangent at an edge of the recess, when viewed from the first end face.

Preferably, in the non-uniform arrangement, the first angular spacings of a respective pair of adjacent recesses are identical. In the case of a plurality of non-uniform arrangements, the second angular spacings are preferably identical. The second angular spacing may be smaller than or greater than the first angular spacing. In particular, the second angular spacing may be smaller than or greater than the first angular spacing by at least $360°/(2×P×N×m×20)$, preferably at least by $360°/(2×P×N×m×10)$.

It is preferable for the recesses of a first arrangement, which is in the form of a non-uniform arrangement to form the slots. The slots can thereby take up the displaced shaping, which is provided for according to the invention in order to allow quieter operation.

Alternatively, it can be provided for the recesses of a first arrangement to form the slots and to be arranged regularly in the circumferential direction of the entire stator core.

Preferably, the stator according to the invention has a receiving space for a rotor of the electric machine. Furthermore, the stator core may have a covering face, which faces the receiving space. Preferably, the covering face is a radially inner covering face of the stator core, which particularly delimits an air gap between the stator and rotor in the electric machine.

In an advantageous embodiment, it can be provided that the recesses of a second arrangement can extend through the covering face. Preferably, the number of recesses of the second arrangement corresponds to the number of recesses of the first arrangement. In particular, the number of recesses, which belong to a respective zone of the winding zones, of the first arrangement corresponds to the number of recesses, which belong to a respective zone of the winding zones, of the second arrangement.

The recesses of the second arrangement can form slot openings of the stator core which connect the slots to the receiving space. Open slots of the stator can thereby be constructed. Alternatively, the recesses of the second arrangement can form pseudo-slot openings of the stator core, which form blind holes in a radial direction. In this case, the recess of the second arrangement can be separated by the stator core completely from the slots. Thus, closed slots with associated pseudo-slots can be constructed, which allows a particularly favourable magnetic flux path in the stator core.

The recesses of the second arrangement are preferably arranged in a circumferential direction at angular positions, at which they are overlapped by the slots. In this case, the recesses of the second arrangement, if they form the slot openings, can form a continuous radial connection from the receiving space into a respective slot. If the recesses of the second arrangement form the pseudo-slot openings, each recess of the second arrangement can be located on a radial line, which extends through one of the slots.

Typically, the recesses of the second arrangement have a smaller extent in a circumferential direction than the slots.

It can be provided that the second arrangement can be in the form of a non-uniform arrangement. Quieter operation can thereby also be achieved independently of a displaced shaping of the slots. Alternatively, the recesses of the second arrangement may be arranged regularly in a circumferential direction of the entire stator core.

There may further be provided that the recesses of a third arrangement can extend through the covering face. Preferably, the number of recesses of the third arrangement corresponds to the number of recesses of the first arrangement and/or the number of recesses of the second arrangement. In particular, the number of recesses, which belong to a respective zone of the winding zones, of the first arrangement and/or the number of recesses, which belong to a respective zone of the winding zones, of the second arrangement corresponds to the number of recesses, which belong to a respective zone of the winding zones, of the third arrangement.

There may advantageously be provided that the recesses of the third arrangement can be arranged in a circumferential direction at angular positions, which are located between those of a respective pair of adjacent slots. In particular, no radial line, which extends through a respective recess of the recesses of the third arrangement, extends through one of the slots.

The recesses of the third arrangement can form pseudo-slot openings, which form blind holes in a radial direction.

Preferably, the third arrangement is in the form of a non-uniform arrangement. Alternatively, the recesses of the third arrangement can be arranged regularly in a circumferential direction of the entire stator core.

In the stator according to the invention, there may further be provided that the stator core can be divided for a respective arrangement into first up to $2×P×N$-th sectors, wherein a respective sector is divided into first up to m-th part-sectors, wherein m corresponds to the number of recesses of the respective arrangement which belong to one of the winding zones, wherein for every $1≤j≤2×P×N$ and every $1≤k≤m$ the k-th recess which belongs to the j-th sector is arranged so completely in the k-th part-sector of the j-th sector that the outer limit, in the clockwise direction when viewed from the first end face, of the k-th part-sector is a tangent of the edge of the k-th recess. In this case, first up to (m-th) central angles of the first up to (m−1)-th part-sectors can correspond to the first angular spacing and an m-th central angle of the m-th part-sector can correspond to the second angular spacing. Preferably, each sector comprises precisely one winding zone. Typically, the sectors, part-sectors and recesses are denoted in their sequence in the circumferential direction.

In a non-uniform arrangement, the m-th central angle may be different from the first up to (m−1)-th central angles. If the recesses of an arrangement are arranged regularly in a circumferential direction of the entire stator core, the first up to m-th central angles can be identical.

In the stator according to the invention, it is further preferable for slots to form a receiving space for a predetermined number of shaped conductors, from which the stator winding is formed. A so-called hairpin winding can be formed by the shaped conductors. The shaped conductors are preferably formed from bent, electrically conductive rods, in particular made from copper. Typically, a predetermined number between four and twelve shaped conductors are received inside a respective slot. This number of shaped conductors can fill a cross sectional surface-area of the recess at a rate of at least 60%, preferably at least 80%, particularly preferably at least 90%. The shaped conductors typically have a rectangular cross section, which is rounded where applicable. Alternatively, however, the stator winding may also be formed from wound wires, in particular with a round cross section.

The object forming the basis of the invention is further achieved by an electric machine for driving a vehicle, comprising a stator according to the invention and a rotor, which is rotatably supported inside the stator. The electric machine is preferably a synchronous machine or an asynchronous machine. The rotor may be a permanently excited rotor. In particular, the electric machine is configured to form a portion of a drive train of the vehicle. The vehicle may be a battery electric vehicle (BEV) or a hybrid vehicle.

Additional advantages and details of the present invention will be appreciated from the embodiments, which are described below and with reference to the drawings.

These drawings are schematic illustrations, in which:

FIG. 1 shows a schematic illustration of a conventional stator;

FIGS. 2 and 3 each show a cross section of a first embodiment of the stator according to the invention;

FIGS. 4 to 7 each show a cross section of additional embodiments of the stator according to the invention;

FIGS. 8 and 9 each show a cross section of a cutout of additional embodiments of the stator according to the invention;

Figure 1:
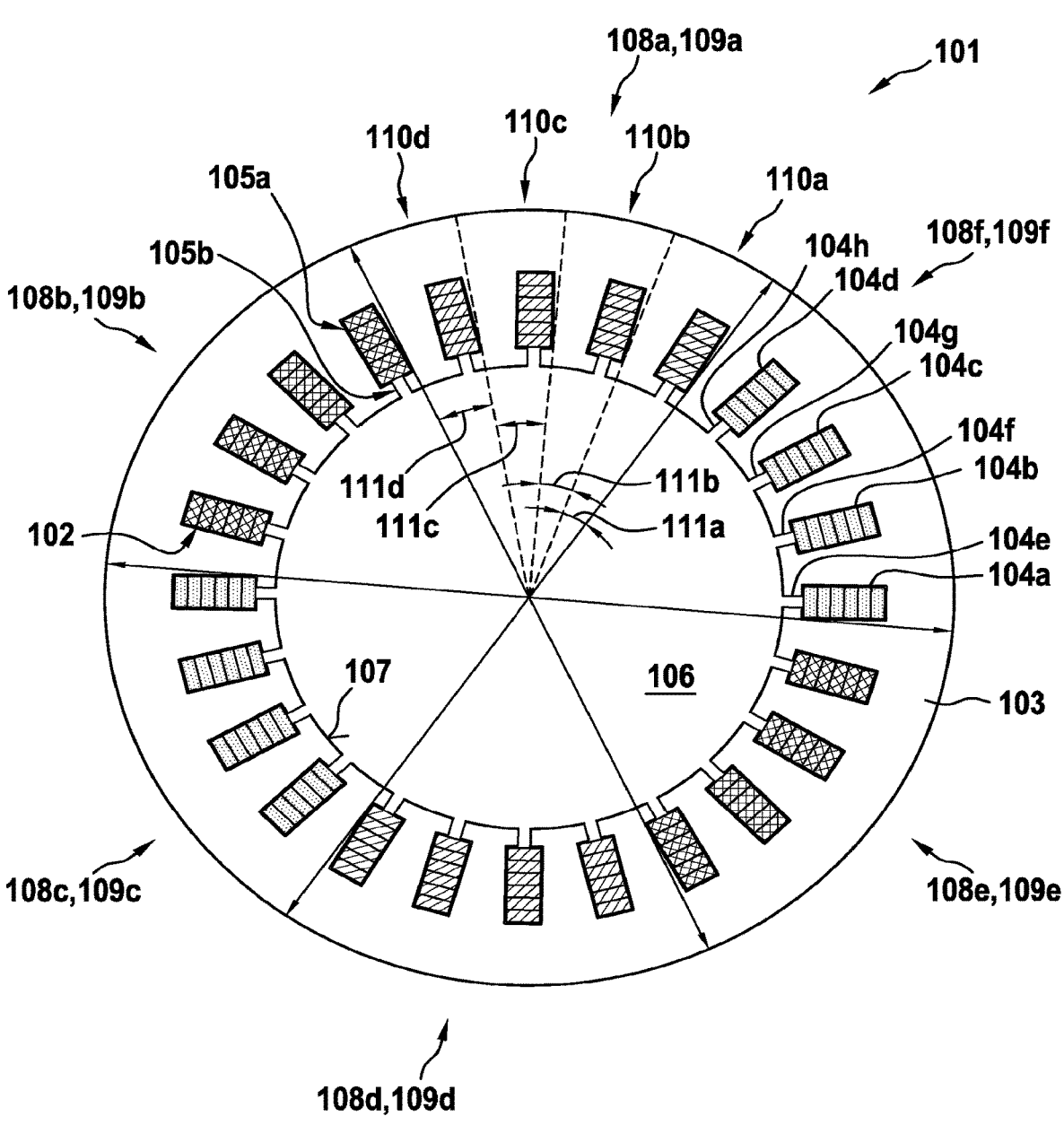
FIG. 1 shows a cross section of a conventional stator 101.

The stator 101 comprises an N-phase (N=3) distributed stator winding 102 which forms a pole pair (P=1) of the stator and a stator core 103 in which there are formed a large number of recesses 104a-h which extend in an axial direction from a first end face, from the direction of which the view is directed toward the cross section according to FIG. 1, to a second end face, which is opposite the first end face, of the stator core 103. The recesses 104a-h form a first arrangement 105a of recesses 104a-d and a second arrangement 105b of recesses 104e-h. The recesses 104a-d of the first arrangement 105a form slots which receive the stator winding 102. The recesses 104e-h of the second arrangement 105b form slot openings which connect the recesses 104a-d of the first arrangement 105a to a receiving space 106 for a rotor by extending through an inner covering face 107 of the stator core 103.

The stator core is divided into six (2×P×N) winding zones 108a-f, which follow each other uniformly in a circumferential direction. Of the recesses 104a-d, 104 e-h of a respective arrangement 105a, 105b, m=4 recesses belong to one of the winding zones 108a-f.

In the first arrangement 105a, each pair of recesses 104a-d which are adjacent in a circumferential direction and which belong to the same winding zone 108a-f has a first angular spacing 111a-c in a circumferential direction relative to each other. Furthermore, each pair of recesses 104a, 104d which are adjacent in a circumferential direction and which belong to different winding zones 108a-f has a second angular spacing 111d in a circumferential direction relative to each other. The first and second angular spacings are identical so that the recesses 104a-d are arranged regularly in a circumferential direction of the entire stator core 103.

Consequently, the stator core 103 can be divided for the first arrangement 105a into first to sixth (2×P×N-th) sectors 109a-f, which are illustrated in FIG. 1 by solid radial arrows. A respective sector 109a-f is again divided into first to fourth (m-th) part-sectors 110a-d, which are illustrated in FIG. 1 for the first sector 109a by broken radial lines. For every $1 \leq j \leq 6 = 2 \times P \times N$ and every $1 \leq k \leq m = 4$, the k-th recess 104a-d which belongs to the j-th sector 109a-f is arranged so completely in the k-th part-sector 110a-d of the j-th sector 109a-f that the outer limit of the k-th part-sector 110a-d, when viewed from the first end face in a clockwise direction, is a tangent of the edge of the k-th recess 104a-d. In this case, central angles of a respective part-sector 110a-d correspond to the first and second angular spacings 111a-d and are identical so that all the recesses 104a-d are arranged at equidistant positions in a circumferential direction.

In a similar manner, the recesses 104e-h of the second arrangement 105b are also arranged regularly in a circumferential direction of the stator core 103.

Figure 2:
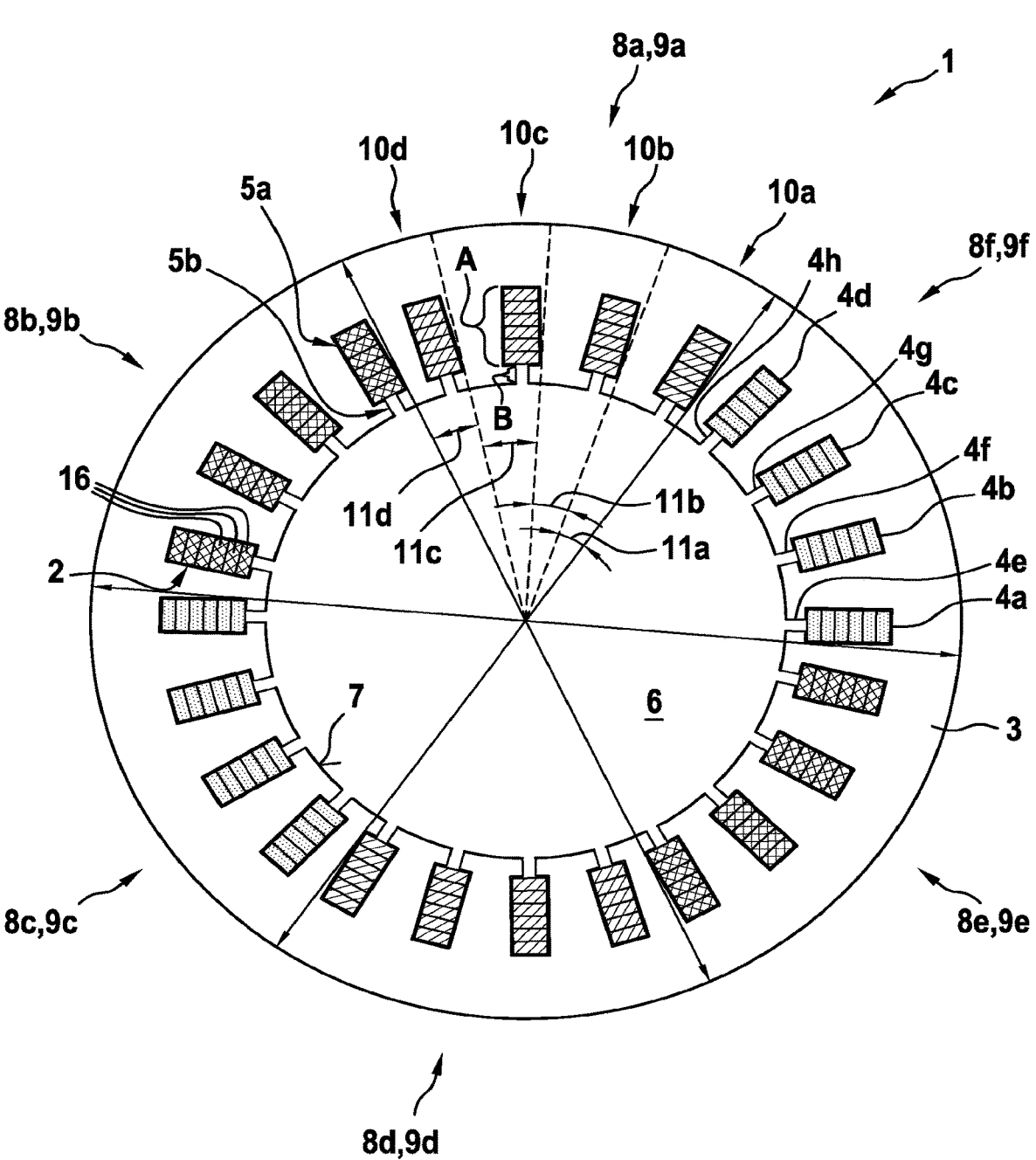
Figure 3:
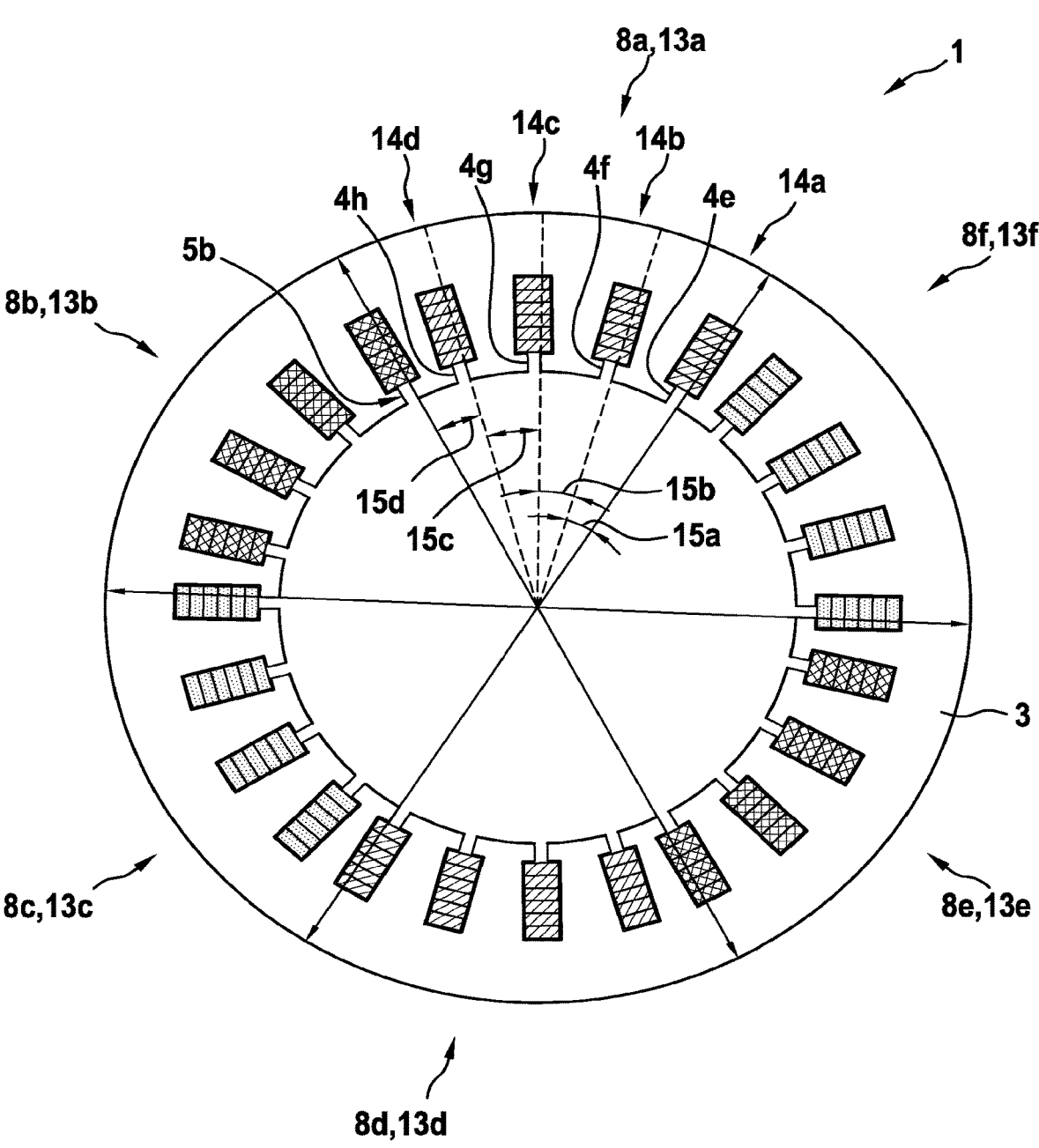

FIG. 2 and FIG. 3 each show a cross section of a first embodiment of a stator 1.

The stator 1 comprises an N-phase (N=3) distributed stator winding 2 which forms a pole pair (P=1) of the stator 1 and a stator core 3, in which there are formed a large number of recesses 4a-h which extend in an axial direction from a first end face, from the direction of which the view is directed toward the cross section according to FIG. 2, to a second end face, which is opposite the first end face, of the stator core 3. The recesses 4a-h form a first arrangement 5a of recesses 4a-d and a second arrangement 5b of recesses 4e-h. In this case, the recesses 4a-d of the first arrangement 5a form slots A which receive the stator winding 2. The recesses 4e-h of the second arrangement 5b form slot openings B which connect the recesses 4a-d of the first arrangement 5a to a receiving space 6 for a rotor 52 (cf. FIG. 11) by extending through an inner covering face 7 of the stator core 3.

The stator core is divided into six (2×P×N) winding zones 8a-f, which follow each other uniformly in a circumferential direction. Of the recesses 4a-d, 4d-h of a respective arrangement 5a, 5b, m=4 recesses belong to one of the winding zones 8a-f.

In the first arrangement 5a, each pair of recesses 4a-d which are adjacent in a circumferential direction and which belong to the same winding zone 8a-f has a first angular spacing 11a-c in a circumferential direction relative to each other. Furthermore, each pair of recesses 4a, 4d which are adjacent in a circumferential direction and which belong to different winding zones 8a-f has a second angular spacing 11d in a circumferential direction relative to each other. The first angular spacing 11a-c and the second angular spacing 11d are different so that the first arrangement 5a is in the form of a non-uniform arrangement.

In the present embodiment, the second angular spacing 11d is smaller than the first angular spacing 11 a-c. The first angular spacings 11 a-c of the pairs of recesses 4a-d which are adjacent in a circumferential direction and which belong to the same winding zone 8a-f are identical. A respective first angular spacing 11a-c is greater than 360°/(2×P×N×m), whereas the second angular spacing 11d is smaller than 360°/(2×P×N×m).

As illustrated in detail in FIG. 3, in the second arrangement 5b each pair of recesses 4e-h which are adjacent in a circumferential direction and which belong to the same winding zone 8a-f has a first angular spacing 15a-c in a circumferential direction relative to each other. Furthermore, each pair of recesses 4e, 4h which are adjacent in a circumferential direction and which belong to different winding zones 8a-f has a second angular spacing 15d in a circumferential direction relative to each other. The first angular spacing 15a-c and the second angular spacing 11d are different so that the second arrangement 5b is in the form of a non-uniform arrangement.

In the present embodiment, the second angular spacing 15d is smaller than the first angular spacing 15a-c. The first angular spacings 15a-c of the pairs of recesses 4e-h which are adjacent in a circumferential direction and which belong to the same winding zone 8a-f are identical. A respective first angular spacing 15a-c is greater than 360°/(2×P×N×m), whereas the second angular spacing 15d is smaller than 360°/(2×P×N×m).

Furthermore, in the first embodiment, the first and second angular spacings 11a-d of the first arrangement 5a correspond to the first and second angular spacings 15$a$-$d$ of the second arrangement 5$b$ so that the slot openings B, which are formed by the recesses 4$e$-$h$, are located at identical relative positions in relation to the slots A which are formed by the recesses 4$a$-$d$. In this instance, the slot openings B are located centrally relative to the slots A.

Consequently, the stator core 3 can be divided for the first arrangement 5$a$ into first to sixth (2×P×N-th) sectors 9$a$-$f$, which are illustrated in FIG. 2 by solid radial arrows. A respective sector 9$a$-$f$ is again divided into first to fourth (m-th) part-sectors 10$a$-$d$, which are illustrated in FIG. 2 for the first sector 9$a$ by broken radial lines. For every 1 j 6=2×P×N and every 1 k m=4, the k-th recess 4$a$-$d$ which belongs to the j-th sector 9$a$-$f$ is arranged so completely in the k-th part-sector 10$a$-$d$ of the j-th sector 9$a$-$f$ that the outer limit of the k-th part-sector 10$a$-$d$, when viewed from the first end face in a clockwise direction, is a tangent of the edge of the k-th recess 4$a$-$d$. In this case, first to third [(m−1)-th] central angles of the first to third [(m−1)-th)] part-sectors 10$a$-$c$ correspond to the first angular spacings 11$a$-$c$ and are identical. The first to third [(m−1)-th] central angles, on the one hand, and a fourth central angle, which corresponds to the second angular spacing 11$d$, of a fourth (m-th) part-sector 10$d$, on the other hand, are different. In the present embodiment, the fourth central angle is smaller than a respective angle of the first to third central angles.

Furthermore, it is possible to divide the stator core 3 for the second arrangement 5$b$ into first to sixth (2×P×N-th) sectors 13$a$-$f$, which are illustrated in FIG. 3 by solid radial arrows. A respective sector 13$a$-$f$ is again divided into first to fourth (m-th) part-sectors 14$a$-$d$, which are illustrated in FIG. 3 for the first sector 13$a$ by broken radial lines. For every 1≤j≤6=2×P×N and every 1≤k≤m=4, the k-th recess 4$e$-$h$ which belongs to the j-th sector 13$a$-$f$ is arranged so completely in the k-th part-sector 14$a$-$d$ of the j-th sector 13$a$-$f$ that the outer limit of the k-th part-sector 14$a$-$d$, when viewed from the first end face in a clockwise direction, is a tangent of the edge of the k-th recess 4$e$-$h$. In this case, first to third [(m−1)-th] central angles of the first to third [(m−1)-th)] part-sectors 14$a$-$c$ correspond to the first angular spacings 15$a$-$c$ and are identical. The first to third [(m−1)-th] central angles, on the one hand, and a fourth central angle, which corresponds to the second angular spacing 15$d$, of a fourth (m-th) part-sector 14$d$, on the other hand, are different. In the present embodiment, the fourth central angle is smaller than a respective angle of the first to third central angles.

Furthermore, in the present embodiment the central angles 11$a$-$d$ of the first arrangement 5$a$ correspond to the central angles 15$a$-$d$ of the second arrangement 5$b$.

The stator 1 has by way of example a number of holes which is four (m=4), wherein the number of holes corresponds to the number of recesses 4$a$-$d$, 4$e$-$h$, which belong to a respective winding zone 8$a$-$f$, of a respective arrangement 5$a$, 5$b$.

By way of example, the stator winding 2 is formed by a large number of shaped conductors 16 (see FIG. 2) so that the stator winding 2 is a hairpin winding. For example, six shaped conductors 16 are arranged in each recess 4$a$-$d$ of the first arrangement 5$a$.

Additional embodiments of a stator 1, which correspond to the stator 1 according to the first embodiment except for the differences described below, are described below. Identical or functionally equivalent components are provided with identical reference signs here.

Figure 4:
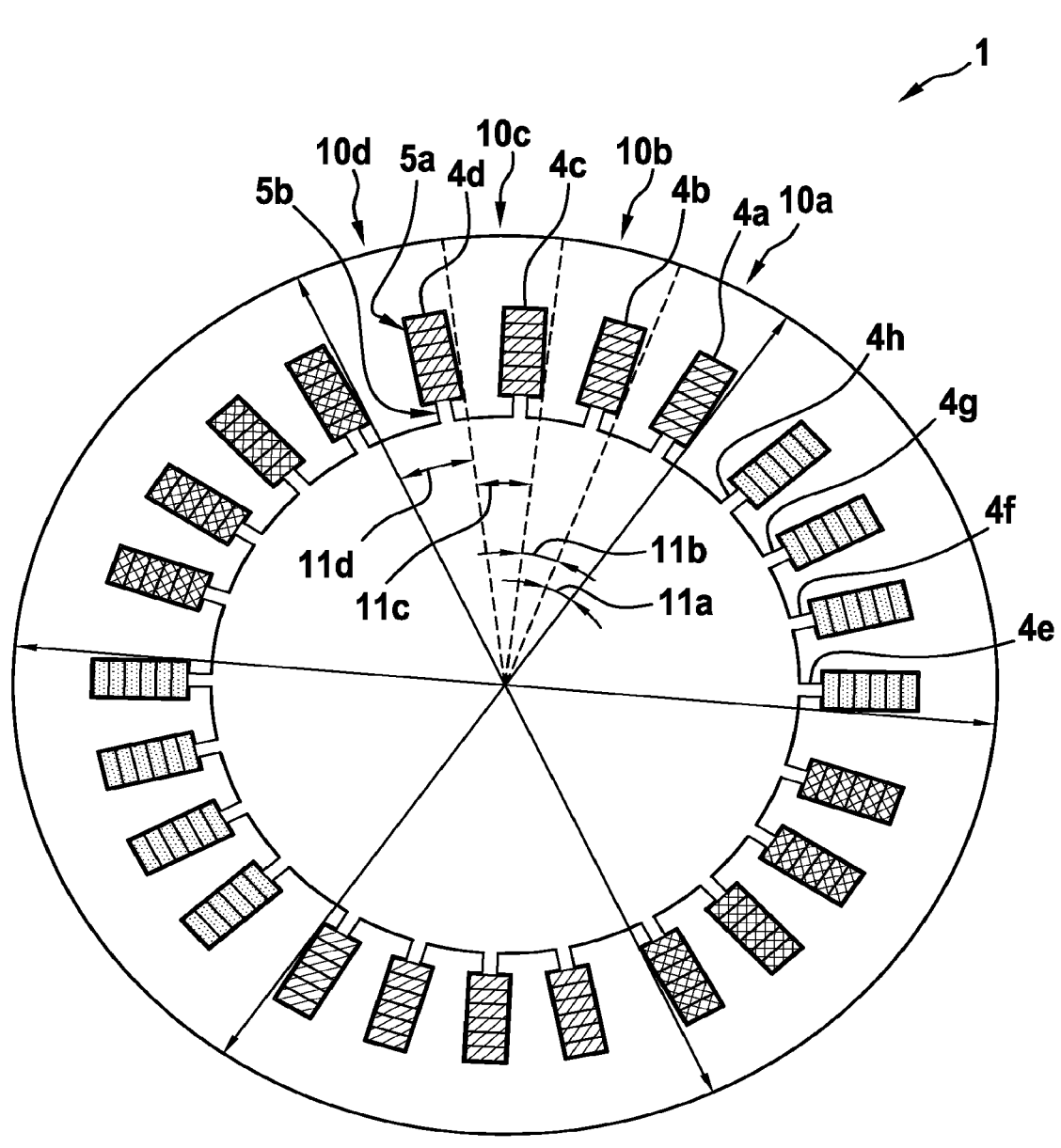

FIG. 4 shows a cross section of a second embodiment of a stator 1.

According to the second embodiment, in the first arrangement 5$a$ the second angular spacing 11$d$ is greater than the first angular spacing 11$a$-$c$. In this case, the first angular spacing 11$a$-$c$ is less than 360°/(2×P×N×m), whereas the second angular spacing 11$d$ is greater than 360°/(2×P×N×m). Similarly, in the second arrangement 5$b$ the second angular spacing 15$d$ (not shown) is greater than the first angular spacing 15$a$-$c$ (not shown). In this case, the first angular spacing 15$a$-$c$ is less than 360°/(2×P×N×m), whereas the second angular spacing 15$d$ is greater than 360°/(2×P×N×m).

Figure 5:
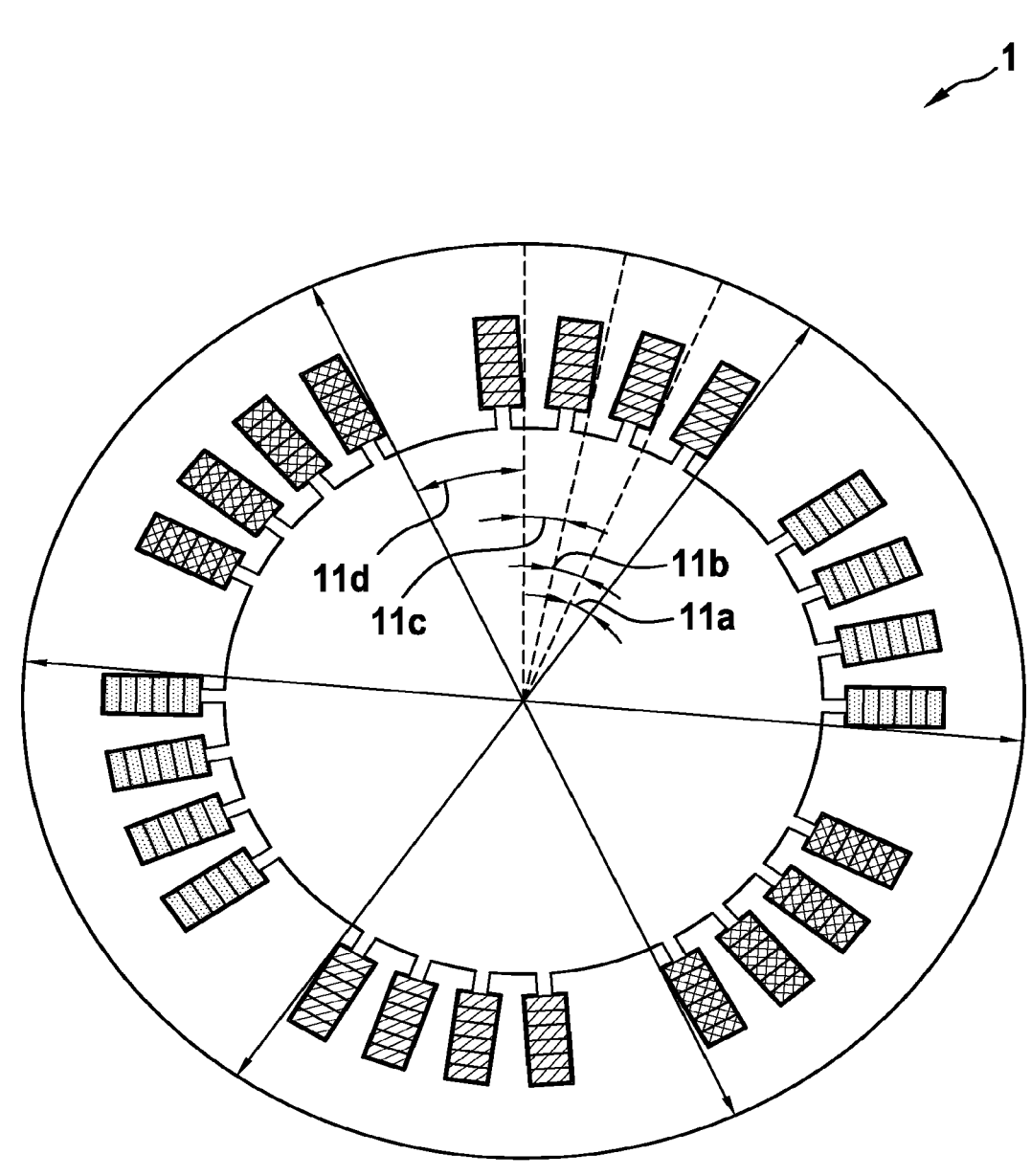

FIG. 5 shows a cross section of a third embodiment of a stator 1 which corresponds to the second embodiment in that the first angular spacings 11$a$-$c$, 15$a$-$c$ or the first to third central angles are substantially greater than the second angular spacings 11$d$, 15$d$ or the fourth central angles (first and second angular spacings not shown).

Figure 6:
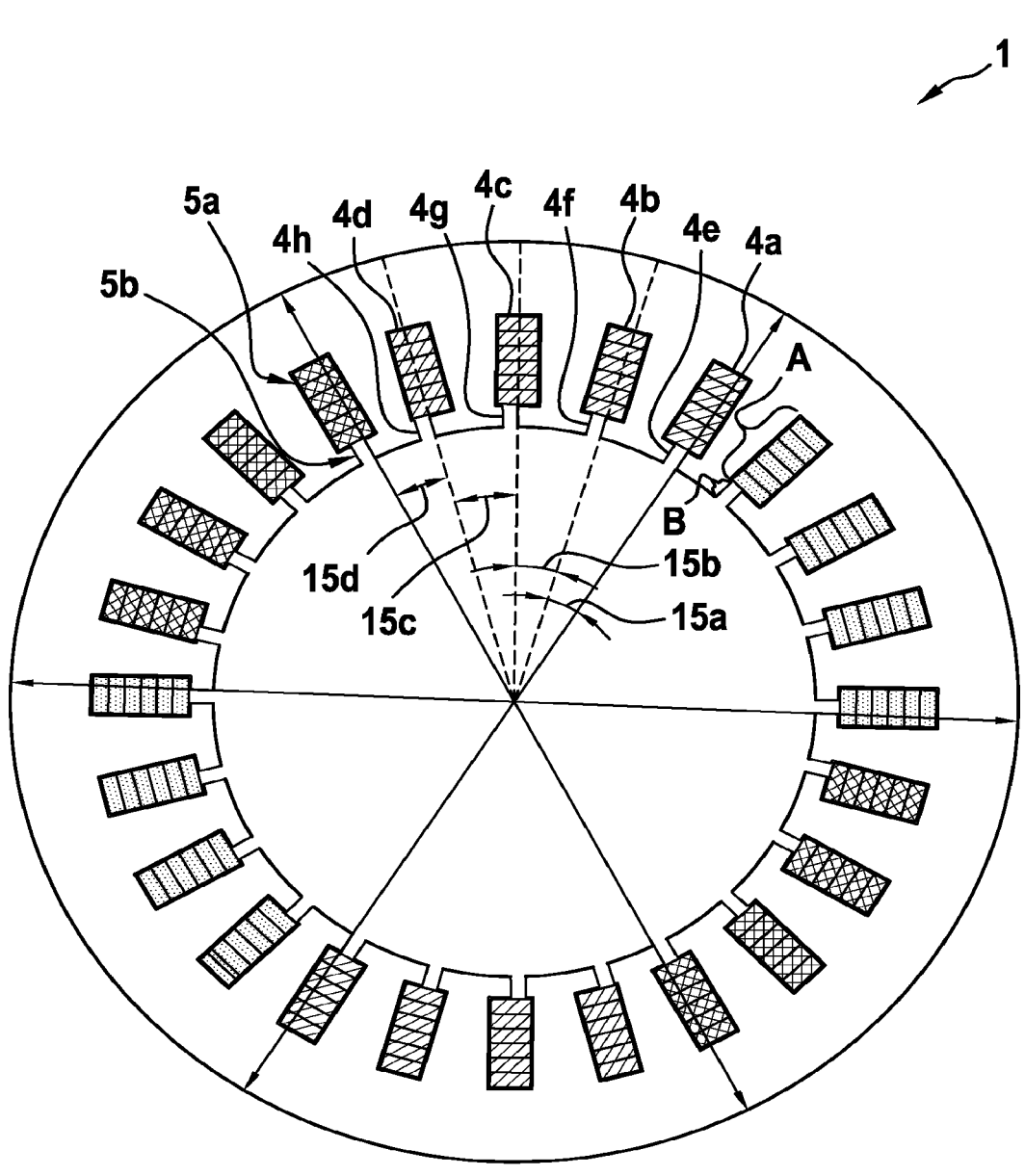

FIG. 6 shows a cross section of a fourth embodiment of a stator 1.

According to the fourth embodiment, in the first arrangement 5$a$ the first and second angular spacings 11$a$-$d$ (not shown) are identical so that the first arrangement is not formed as a non-uniform arrangement. The recesses 4$a$-$d$ of the first arrangement 5$a$ which form the slots A are arranged regularly in a circumferential direction of the entire stator core 3.

In the second arrangement 5$b$, the second angular spacing 15$d$—as in the first embodiment—is smaller than the first angular spacing 15$a$-$c$. The recesses 4$e$-$h$ which form the slot openings B are thereby located at different relative positions in relation to the recesses 4$a$-$d$, which form the slots A.

Figure 7:
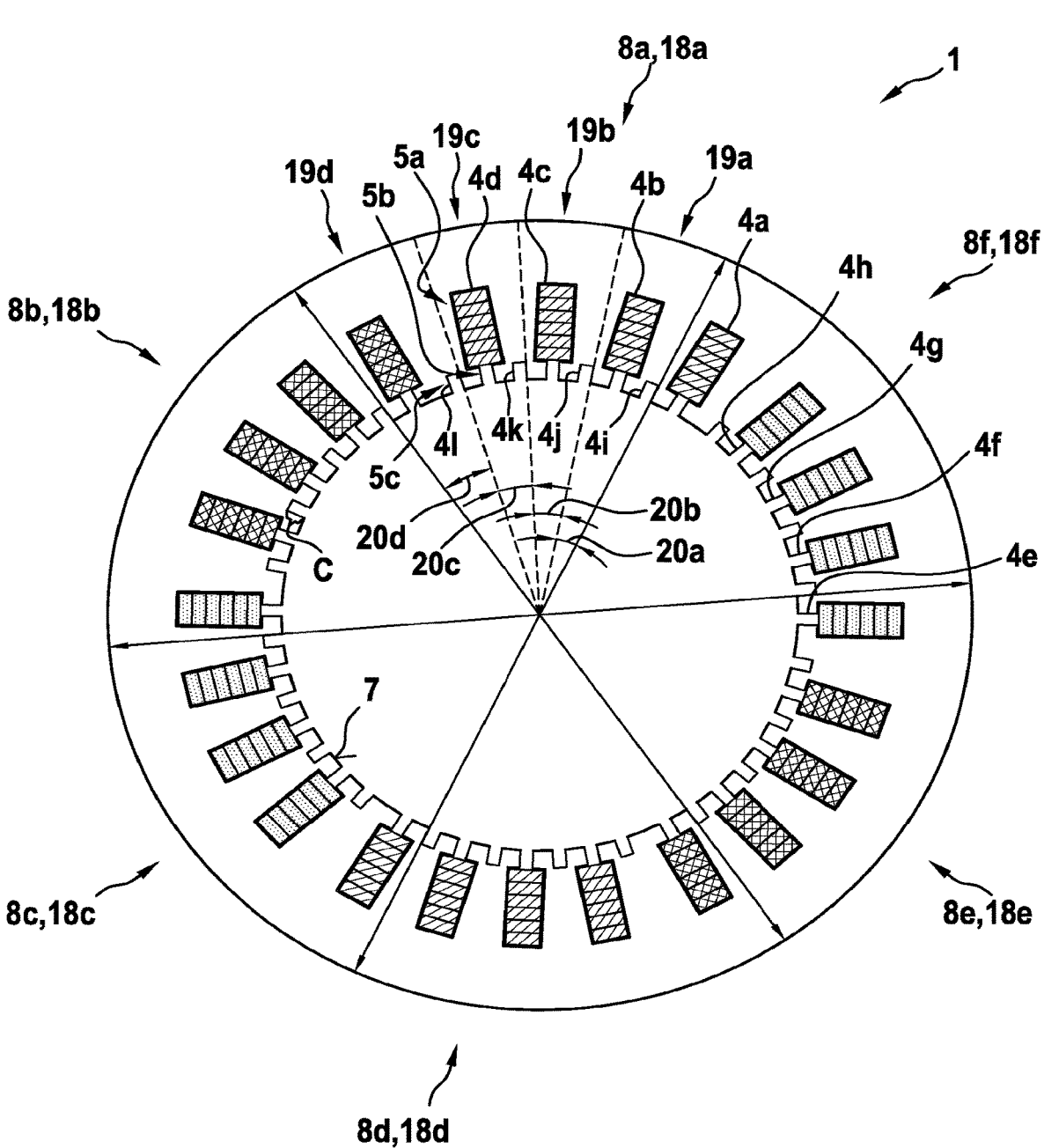

FIG. 7 shows a cross section of a fifth embodiment of a stator 1, which corresponds to the second embodiment except for the following differences.

In the third embodiment, a third arrangement 5$c$ of recesses 4$i$-$l$, which are in the form of pseudo-slot openings C is provided. The recesses 4$i$-$l$ extend through the covering face 7 and are arranged in a circumferential direction at positions which are located between those of a respective pair of adjacent recesses 4$a$-$d$ of the first arrangement 5$a$ or between those of a respective pair of adjacent recesses 4$e$-$h$ of the second arrangement 5$b$. The third arrangement 5$c$ is in the form of a non-uniform arrangement, wherein a second angular spacing 20$d$ is greater than the first angular spacing 20$a$-$c$.

Furthermore, it is possible to divide the stator core 3 for the third arrangement 5$c$ into first to sixth (2×P×N-th) sectors 18$a$-$f$, which are illustrated in FIG. 7 by solid radial arrows. A respective sector 18$a$-$f$ is again divided into first to fourth (m-th) part-sectors 19$a$-$d$, which are illustrated in FIG. 3 for the first sector 18$a$ by broken radial lines. For every 1≤j≤6=2×P×N and every 1≤k≤m=4, the k-th recess 4$i$-$l$ which belongs to the j-th sector 18$a$-$f$ is arranged so completely in the k-th part-sector 19$a$-$d$ of the j-th sector 18$a$-$f$ that the outer limit of the k-th part-sector 19$a$-$d$, when viewed from the first end face in a clockwise direction, is a tangent of the edge of the k-th recess 4$i$-$l$. In this case, first to third [(m−1)-th] central angles of the first to third [(m−1)-th)] part-sectors 19$a$-$c$ correspond to the first angular spacings 20$a$-$c$ and are identical. The first to third [(m−1)-th] central angles, on the one hand, and a fourth central angle, which corresponds to the second angular spacing 20$d$, of a fourth (m-th) part-sector 19$d$, on the other hand, are different. In the present embodiment, the fourth central angle is greater than a respective angle of the first to third central angles.

Alternatively, according to another embodiment the second angular spacing 20*d* can be smaller than the first angular spacing 20*a-c*.

Figure 8:
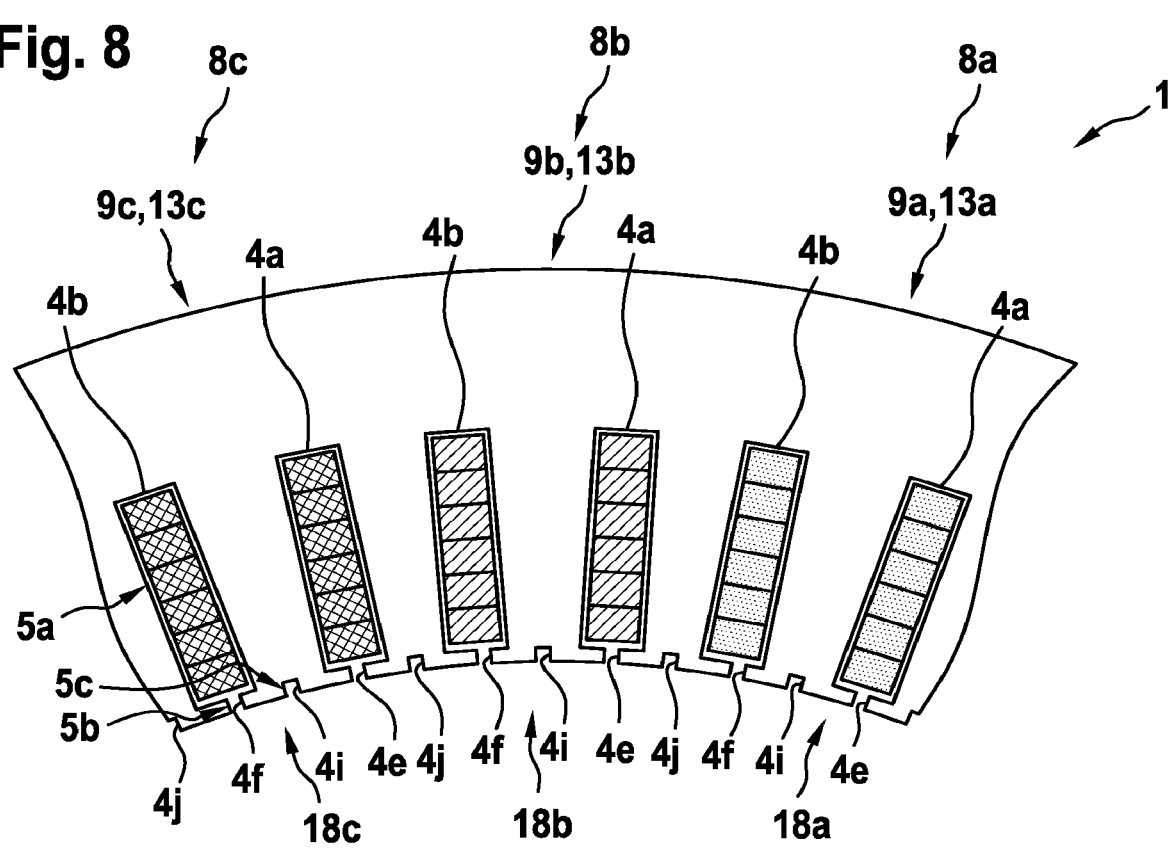

FIG. 8 shows a cross section of a cut-out of a sixth embodiment of a stator 1, to which the explanations relating to the fifth embodiment can be applied.

In the stator 1 according to the sixth embodiment, only m=2 recesses 4*a*, 4*b*, 4*e*, 4*f*, 4*i*, 4*j* belong to each winding zone 8*a*, 8*b*, 8*c* in each arrangement 5*a-c*. The number of pole pairs P is, for example, 4, 6 or 8. The number of holes of the stator is m=2. In this case, the arrangements 5*a*, 5*c* are non-uniform arrangements. Accordingly, the first and second central angles of a respective sector 9*a*, 9*b*, 9*c*, 18*a*, 18*b*, 18*c* are different. In the second arrangement 5*b*, the recesses 4*e-h* are arranged regularly in a circumferential direction of the entire stator core 3. Accordingly, the first and second central angles of a respective sector 13*a*, 13*b*, 13*c* are different.

Figure 9:
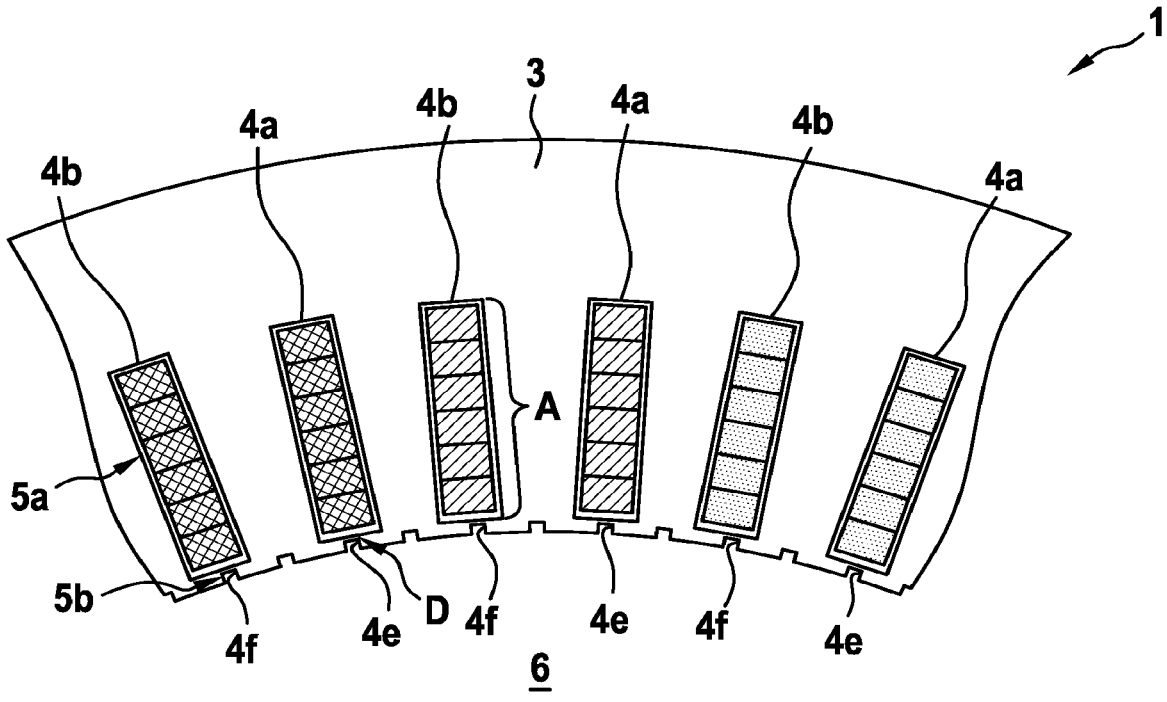

FIG. 9 shows a cross section of a seventh embodiment of a stator 1 which corresponds to the sixth embodiment in that the recesses 4*a*, 4*b* of the first arrangement 5*a* form closed slots A which are separated from the receiving space 6 by the stator core 3. Furthermore, the recesses 4*e*, 4*f* of the second arrangement 5*b* form pseudo-slot openings D.

Figure 10:
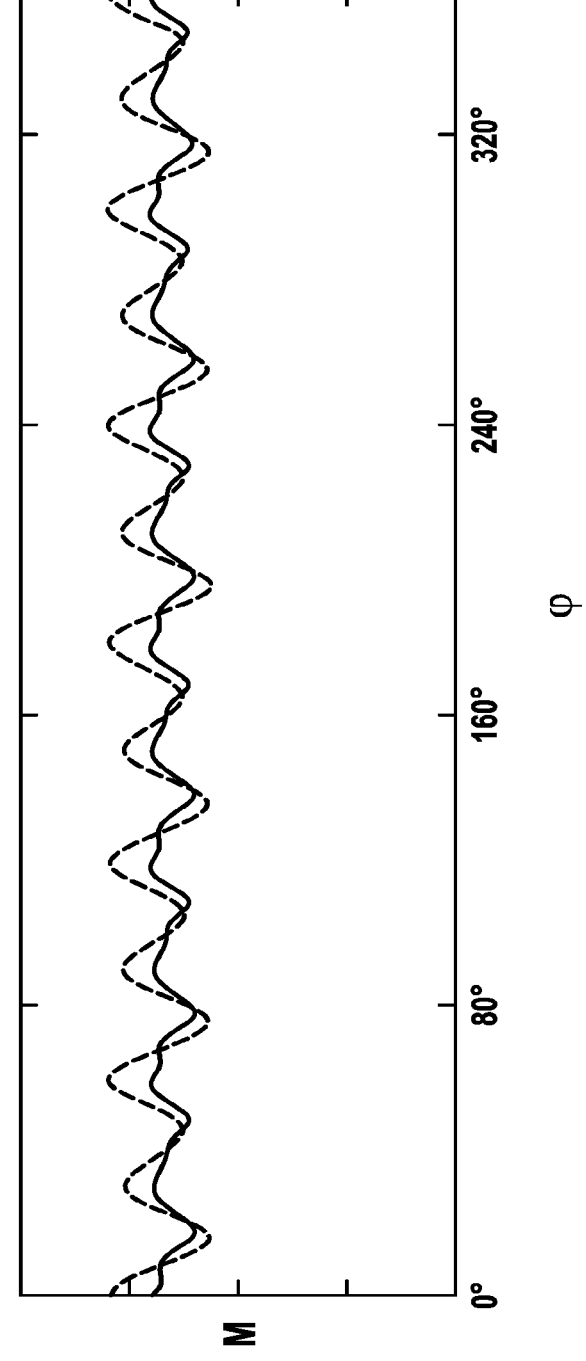
FIG. 10 shows a graph of a torque against an angular position of a rotor during operation of an embodiment of the stator according to the invention in comparison with a conventional stator.

FIG. 10 shows a graph of a torque M against an angular position φ of a rotor 52 (cf. FIG. 11) during operation of an embodiment of the stator 1, as shown by a solid line, in comparison with a conventional stator 100, as shown by a broken line. It can be seen that a torque ripple in the stator 1 with displaced sectors is substantially less than in the conventional stator 100.

Figure 11:
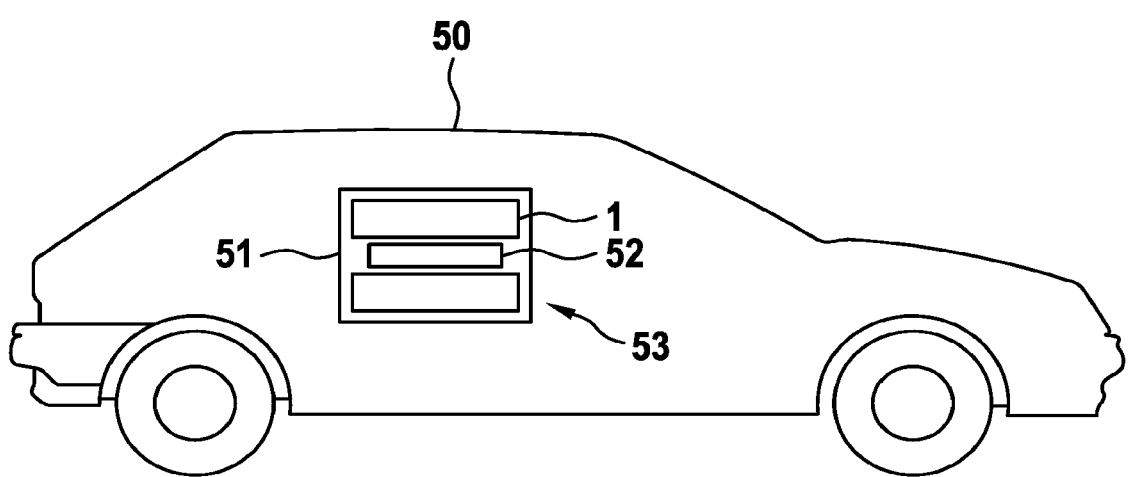
FIG. 11 shows a basic diagram of a vehicle having an exemplary embodiment of the electric machine according to the invention.

FIG. 11 is a schematic diagram of an exemplary embodiment of a vehicle 50 with an exemplary embodiment of an electric machine 51.

The electric machine 51 has a stator 1 according to one of the above-described embodiments and a rotor 52, which is rotatably supported inside the stator 1. The electric machine 51 is in the form of a, particularly permanently excited, synchronous machine or an asynchronous machine and is configured to drive the vehicle 50. The electric machine 51 is thus part of a drive train 53 of the vehicle 50. The vehicle 50 is a battery-electric vehicle (BEV) or a hybrid vehicle.

The invention claimed is:

1. A stator for an electric machine, wherein
    the stator has a distributed stator winding having a number N of phase windings, a number P of pole pairs and a stator core, in which slots are
    formed, wherein the stator winding is arranged in the slots; wherein
    the stator core is divided into 2×P×N winding zones which follow each other uniformly in a circumferential direction; wherein
    the stator core has a large number of recesses which extend in an axial direction from a first end face of the stator core to a second end face, which is opposite the first end face, of the stator core; wherein
    the recesses form at least one arrangement of recesses which follow each other in a circumferential direction and at least two recesses of the arrangement belong to one of the winding zones; wherein
    each pair of recesses which are adjacent in a circumferential direction and which belong to the same winding zone has a first angular spacing in a circumferential direction relative to each other; wherein
    each pair of recesses which are adjacent in a circumferential direction and which belong to different winding zones has a second angular spacing in a circumferential direction relative to each other;
wherein
    in at least one arrangement the first angular spacing and the second angular spacing are different so that the arrangement is in the form of a non-uniform arrangement.

2. The stator as claimed in claim 1, wherein
the recesses of a first arrangement which is in the form of a non-uniform arrangement form the slots.

3. The stator as claimed in claim 2, wherein
the stator has a receiving space for a rotor of the electric machine and the stator core has a covering face which faces the receiving space.

4. The stator as claimed in claim 1, wherein
the recesses of a first arrangement form the slots and are arranged regularly in the circumferential direction of the entire stator core.

5. The stator as claimed in claim 1, wherein
the stator has a receiving space for a rotor of the electric machine and the stator core has a covering face which faces the receiving space.

6. The stator as claimed in claim 5, wherein
the recesses of a second arrangement extend through the covering face.

7. The stator as claimed in claim 6, wherein
the recesses of the second arrangement form slot openings of the stator core which connect the slots to the receiving space or form pseudo-slot openings of the stator core which form blind holes in a radial direction.

8. The stator as claimed in claim 7, wherein
the recesses of the second arrangement are arranged in a circumferential direction at angular positions, at which they are overlapped by the slots.

9. The stator as claimed in claim 7, wherein the second arrangement is in the form of a non-uniform arrangement.

10. The stator as claimed in claim 7, wherein
the recesses of the second arrangement are arranged regularly in a circumferential direction of the entire stator core.

11. The stator as claimed in claim 6, wherein
the recesses of the second arrangement are arranged in a circumferential direction at angular positions, at which they are overlapped by the slots.

12. The stator as claimed in claim 6, wherein
the second arrangement is in the form of a non-uniform arrangement.

13. The stator as claimed in claim 6, wherein
the recesses of the second arrangement are arranged regularly in a circumferential direction of the entire stator core.

14. The stator as claimed in claim 6, wherein
the recesses of a third arrangement extend through the covering face.

15. The stator as claimed in claim 5, wherein
the recesses of a third arrangement extend through the covering face.

16. The stator as claimed in claim 15, wherein
the recesses of the third arrangement are arranged in a circumferential direction at angular positions which are located between those of a respective pair of adjacent slots.

17. The stator as claimed in claim 15, wherein
the recesses of the third arrangement form pseudo-slot openings which form blind holes in a radial direction.

18. The stator as claimed in claim 15, wherein the third arrangement is in the form of a non-uniform arrangement.

19. The stator as claimed in claim 15, wherein the recesses of the third arrangement are arranged regularly in a circumferential direction of the entire stator core.

20. An electric machine for driving a vehicle, comprising a stator as claimed in claim 1 and a rotor which is rotatably sup-ported inside the stator.

\*   \*   \*   \*   \*